Figure 1:
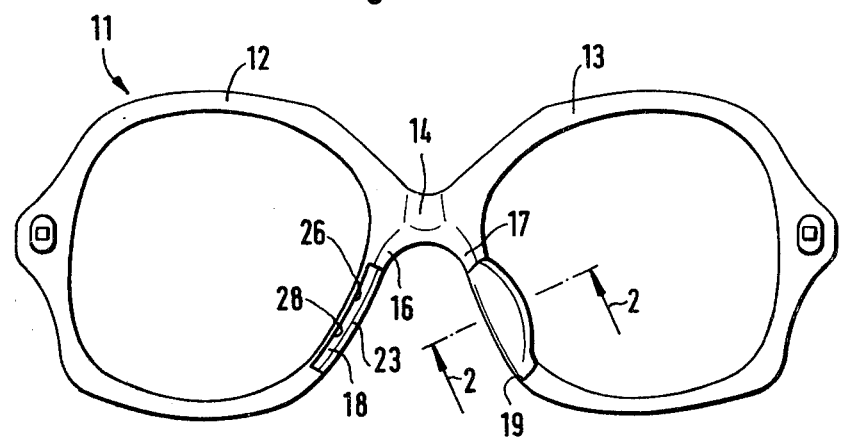

United States Patent [19]

Bononi

[11] 4,142,784
[45] Mar. 6, 1979

[54] PAD FOR SPECTACLE FRAMES

[76] Inventor: Walter H. Bononi, Zeppelinstrasse 9, 7012 Fellbach, Schmiden, Fed. Rep. of Germany

[21] Appl. No.: 781,791

[22] Filed: Mar. 28, 1977

[30] Foreign Application Priority Data

Mar. 27, 1976 [DE] Fed. Rep. of Germany ....... 2613151

[51] Int. Cl.² ............................................. G02C 5/12
[52] U.S. Cl. ..................................... 351/136; 351/87
[58] Field of Search ................. 351/131, 132, 136, 87, 351/78, 80, 88, 138, 139

[56] References Cited

FOREIGN PATENT DOCUMENTS

| 511004 | 8/1939 | United Kingdom | 351/87 |
| 518938 | 3/1940 | United Kingdom | 351/87 |

Primary Examiner—Paul A. Sacher

[57] ABSTRACT

A pad of homogeneous material has a closed, substantially smooth surface. It is age-resistant, wear-resistant and agreeable on the skin. It can be permanently connected to the material used for spectacle frames, made of transparent to opaque material and made with a lustrous surface. It has a Shore D hardness of 10 to 30 measured in accordance with DIN 53 505 and can be manufactured by injection molding.

A recess is provided in the nose flank area of the spectacle rims, on the outside side thereof. The recess bottom is in approximately the plane of the spectacle frame and has a pocket in this plane which extends towards the groove for holding the lens. The pad has a base with an outwardly directed rib which is bonded in the pocket.

1 Claim, 2 Drawing Figures

U.S. Patent    Mar. 6, 1979    4,142,784

PAD FOR SPECTACLE FRAMES

The invention relates to a pad for spectacle frames which is made of a homogeneous material, has a closed and substantially smooth surface, is resistant to ageing and agreeable on the skin in consideration of the use of spectacles, is wear-resistant when spectacles are worn, can be permanently connected to the material used for spectacle frames, made of transparent to opaque material and with a shiny surface, has a Shore D hardness of between 10 and 30 in accordance with DIN 53 505 and can be injection moulded.

The main problem with spectacles is that they should in every respect be satisfactorily supported on the root or bridge of the nose. This problem can be difficult to solve because the supporting face of the pad must remain small for technical or fashionable reasons and/or the wearer must wear the spectacles the entire day and/or the spectacles are heavy, because the dioptre is high and/or the spectacle wearer has a difficult nose shape (e.g. a flat Asiatic nose root) and/or the spectacle wearer is inclined to perspire and/or the spectacle wearer works in a humid environment and/or the spectacle wearer has a sensitive skin and/or the spectacle wearer has insufficient fatty tissue between the skin and the nose base and/or the pads frequently slip on the skin, which can occur e.g. under the influence and force of the wind and/or the pad which previously fit well no longer fits because the nose area of the spectacle wearer has also grown thicker or thinner.

The object of this invention is to confront the problem of providing a pad which cumulatively overcomes the above mentioned difficulties, which can be cheaply mass produced, which from the aesthetic viewpoint imposes just as little restriction on the designer as before, the application of which to the absorption and collection of dirt is just as problem-free as with previously known pads and which can be used in quantity on all types of spectacles, i.e. with which the customer does not need to take any subsequent steps, such as e.g. bonding the inside of known pads to foam material.

My copending Patent Application Ser. No. 731,737, filed Oct. 12, 1976, describes the fundamental step of which material the pads are to be made. It does not however readily indicate how to design the area around the pads in the case of plastic spectacles if it is desired to obtain particularly outstanding solutions.

This invention solves the problem of providing a design in the pad area which permits an economical connection between pad and spectacles, is durable, and aesthetically ideal and in particular emphasizes the softness of the pads.

This problem is solved in accordance with the invention in that the spectacle frames made of plastics material comprise, in the nose flank area of the spectacle rims and on the outer side thereof, a recess which is adapted to fit the base area of the pad and the bottom of which lies in approximately the same plane as the spectacle frame, in that a pocket lying approximately in this plane is provided in the area of the recess bottom, which pocket extends toward the groove for holding the lens in the spectacle frame, in that the base area of the pad comprises an outwardly directed rib and in that this rib is bonded in the pocket.

All the pad as far as its base area now remains movable and accordingly can be better adapted. Despite the pad still being movable, the adhesive joints are subjected to only a slight stress or none at all. The adhesive joint is at a point which enables aesthetically ideal solutions to be provided even in the case of transparent glass spectacle frames. The rib can remain thin and still provide excellent support. The additional amount of material is infinitesimal and, apart from the spectacle frame and pad, no other parts are required. The bearing or contact surface begins at the base of the pad and therefore the soft contact surface is also large. The spectacles therefore make considerably fewer movements relative to the head due to the effect of forces, such as wind or shaking of the head, since they still adhere, as it were, to the nose with the pad. Therefore, the optic axis of the spectacle lens does not change relative to the eye, but remains in its desired or set position. To the spectacle wearer this means that the object which he sees despite the above-mentioned relative movement remains a great deal steadier in view. If spectacles are moved relative to the head of the wearer, only the seen object therefore moves out of range because the optic axis no longer coincide.

The base area of the pad is in external contact with the outer wall of the recess and the remaining part of the pad extends to the rear of the spectacle rim. Through these features, the base area of the pad can be gently supported on the outside by the basically hard outer wall and the pad becomes, as it were, progressively softer towards the rear.

Figure 2:
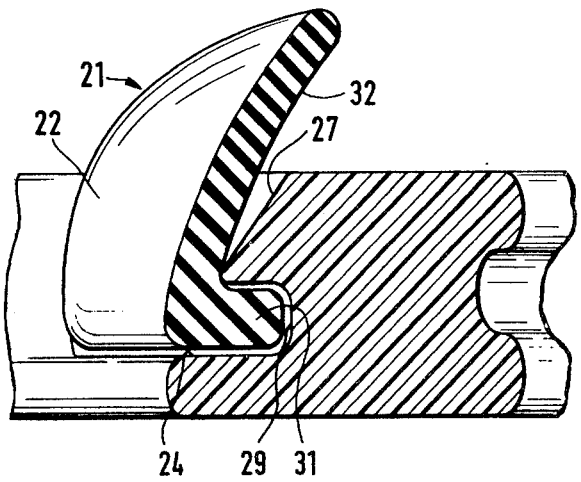

Other advantages and features of the invention are shown in the following description of a preferred embodiment. In the drawings:

FIG. 1 shows, true to scale, a pair of ladies' spectacles made of plastics material, without the spectacle earpieces, and seen from the rear with a pad fitted, FIG. 2 is a section along the line 2—2 shown in FIG. 1, on a substantially larger scale and in fragmentary representation.

A pair of plastic spectacles 11 comprises a pair of spectacle rims 12, 13 which are connected by a bridge 14. Below and behind the bridge 14 the spectacle frame rims 12, 13 comprise sections 16, 17 flanking the nose of the wearer. In the said sections there are provided symmetrical recesses 18, 19 which are approximately one third as deep as the spectacle rim 12, 13 is high at this point, and have a width approximately the same as the thickness of the pad 21 to be used at this point so that the bearing or contact surface 22 of the pad used is in alignment with section 16, 17 or alternatively protrudes by several tenths of a millimeter.

The recesses 18, 19 have the same length as the pads 21. Each recess 18, 19 comprises a bottom 23, 24 at the front and an outer wall 26, 27. Pockets 28, 29 of approximately U-shaped cross section are provided in the recesses, extending outwardly with their rear sides parallel to the bottom 23, 24.

Each pad 21 comprises in its front section an outwardly directed rib 31 which fits in the pocket 28, 29 and is firmly bonded thereto. The pad 21 is supported against the outer wall 26, 27 by the area of the front surface 32 near the base. The part of the pad 21 extending beyond projects freely. There is no adhesive joint provided between the outer wall 26, 27 and the pad 21.

If the pockets 28, 29 are undercut in design, a correspondingly shaped rib 31 can also be positively retained in the pockets 28, 29.

This pad 21 can be made of e.g. a material manufactured by the Huls Company which is sold under the trade name VESTOLID and has the specification "Soft granulated material SSp 56". It has a Shore D hardness of between 15 and 17 in accordance with DIN 53 505. The previously used acetate has, according to this measurement, a hardness of 72 to 75 and the previously used cellulose a hardness of 68 to 72. It can therefore be seen that the hardness is reduced by approximately 3 times.

In principle silicone rubber could also be used, but it needs to be moulded thereby rendering the product more costly than injection-moulded material. However, since pads are on the whole inexpensive, this is hardly of consequence.

In general it should be noted that the pad is sufficiently soft, but not so soft that it is excessively deformable or flexible.

I claim:

1. A pad and a spectacle frame for holding lenses said pad having a base area and comprising a homogeneous material which has a closed and substantially smooth surface, is resistant to aging and agreeable on the skin in view of its use with spectacles, is wear-resistant when spectacles are worn, is permanently connectable to the material used for said spectacle frame, made of translucent material, has a Shore D hardness of 10 to 30 in accordance with DIN 53 505 and is injection moldable, said spectacle frame having spectacle rims made of plastic material having in the nose flank area and on each of the respective outer sides thereof a recess with an outer wall which is shaped to receive said base area of said pad when said spectacles are in use on the nose of a wearer and respective pockets which lie in approximately the same center plane as the spectacle frame in the area of the respective recess bottoms which pockets extend towards their respective grooves for holding respective lenses in the spectacle frame, said base area of each of said pads comprising an outwardly directed rib which is bonded in said pocket, said base area of each of said pads is in external contact with said respective outer walls of said recesses and the remaining part of said pads extend freely to the rear of said spectacle rim when not worn the area between said pads and said outer walls of said respective recesses above said base area comprising an appreciable gap, said gap being free of bonding material.

* * * * *